Figure 5:
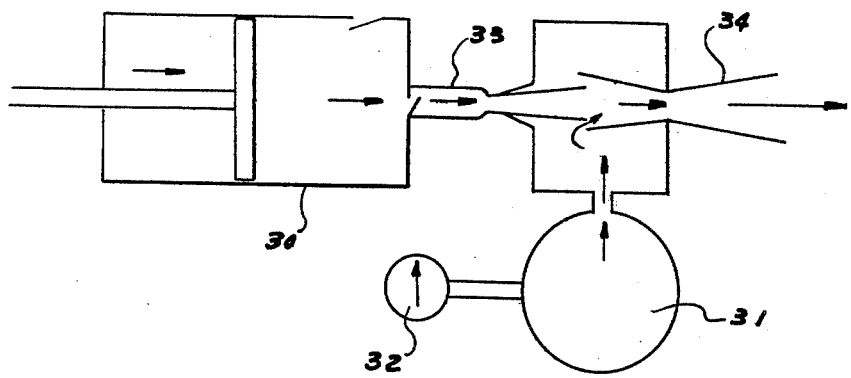

March 19, 1963     H. BLASZKOWSKI     3,081,634
DYNAMIC EXERCISING APPARATUS
Filed June 5, 1959     3 Sheets-Sheet 1
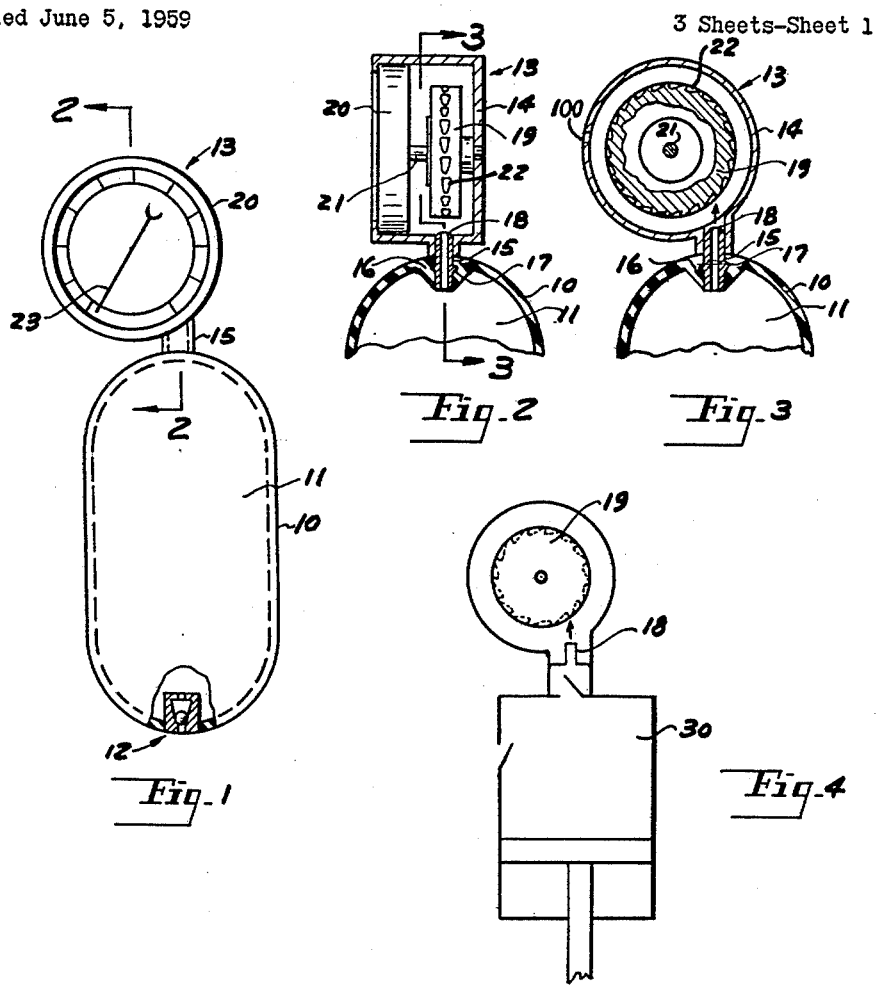
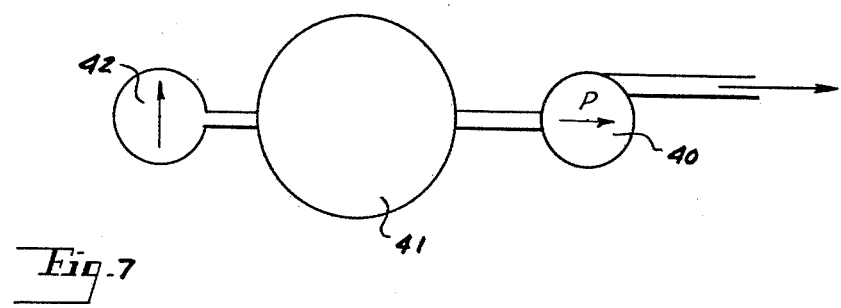
INVENTOR.
HENRY BLASZKOWSKI
BY Melvin Nord
ATTORNEY March 19, 1963　　　H. BLASZKOWSKI　　　3,081,634
DYNAMIC EXERCISING APPARATUS Filed June 5, 1959　　　　　　　　　　　　　3 Sheets-Sheet 2

INVENTOR.
HENRY BLASZKOWSKI
BY Melvin Nord
ATTORNEY

March 19, 1963     H. BLASZKOWSKI     3,081,634
DYNAMIC EXERCISING APPARATUS
Filed June 5, 1959     3 Sheets-Sheet 3
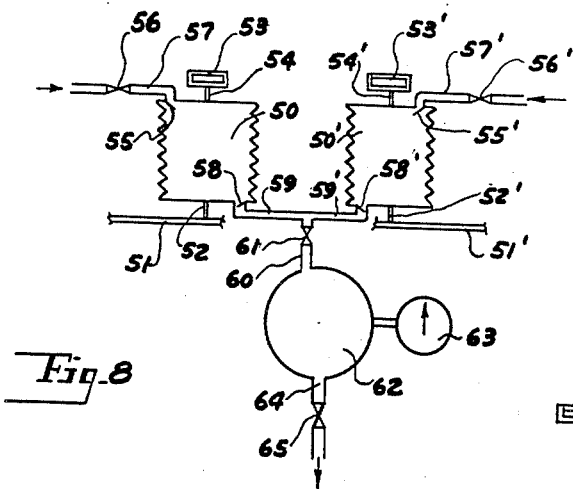
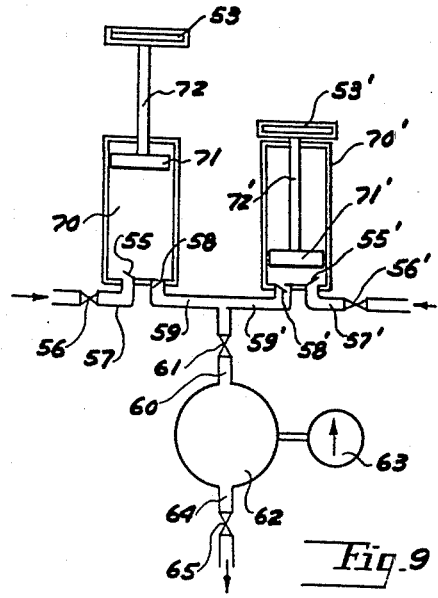
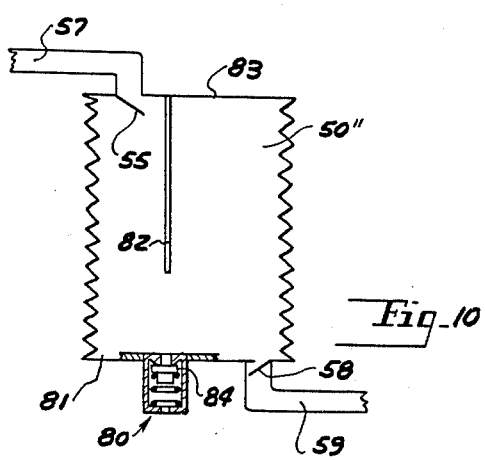
INVENTOR.
HENRY BLASZKOWSKI
ATTORNEY United States Patent Office 3,081,634
Patented Mar. 19, 1963

3,081,634
DYNAMIC EXERCISING APPARATUS
Henry Blaszkowski, 7312 Bingham, Dearborn, Mich.
Filed June 5, 1959, Ser. No. 818,339
3 Claims. (Cl. 73—379)

This invention relates to apparatus for physical exercise. More particularly, it relates to apparatus for exercising, for measuring and regulating the extent of such exercise, and for determining the result of such exercise on the person and his physical condition.

In general, the present invention constitutes an improvement over my co-pending patent application Ser. No. 816,744, filed May 29, 1959, for Exercising Method and Apparatus, now abandoned. In the aforesaid application, I have disclosed what may in general be termed "static" methods and apparatus for exercising and measuring physical condition, e.g. a gaseous fluid is confined within a deformable bulb, and the pressure is measured when the bulb is squeezed in the hand. Such a method is "static" in the sense that it is a "non-flow" process.

On the other hand, the present invention relates to "dynamic" apparatus, wherein a gaseous fluid is not only compressed, but is also propelled. The strength of a person is now determined by a dynamic measurement of the pressure developed under predetermined flow conditions, or of some function of said pressure.

In general, such dynamic methods and apparatus may be classified according to whether they are of the substantially "continuous flow" type (meaning that gaseous fluid is continually entering and also leaving the system), and the "semi-continuous flow" type (meaning that the system has an exit but no entrance for gaseous fluid, or vice versa). For example, I may operate a pump (or gas compressing means) manually, on a repetitive basis, allowing gas to enter the pump at appropriate stages, and allowing compressed gas to leave at appropriate stages through a restricting orifice or nozzle; the pressure maintained at the discharge of the pump (or some function thereof) may be measured continuously. Alternatively, I may manually operate a pump (or gas compressing means) in such manner as to pump up the gas pressure in a storage tank; the rate of increase of pressure in said storage tank, and/or the time required to reach a certain pressure, may be measured, instead of the pressure within the pump.

Devices of this general type, in which repetition of the exercise is necessary in order to attain a specific result (e.g. in order to maintain a certain pressure at the pump discharge, or to pump up a tank to a given pressure within a given time) have the following advantages, among others: (1) There is a distinct aim in repeating the exercise, (2) the speed of repetition, as well as the intensity of the force exerted affect the result; therefore additional factors involving the physical condition of the person come into play; (3) such devices are readily adaptable to virtually any type of exercise, since any type of motion can always be linked up to operate a gas compressing means; and (4) a complex pattern of pressure versus time may be built up which, if plotted or recorded on a graph may permit a sort of "spectrum-type analysis" of the person's physical condition.

Other objects and advantages of the invention will more fully appear from the following description and drawings, wherein are disclosed preferred embodiments of the invention.

Figure 6:
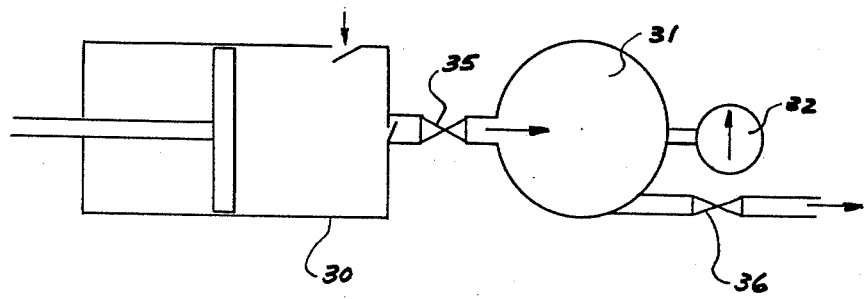

In the drawings,
FIG. 1 is a front elevation of one embodiment of the invention;
FIG. 2 is a fragmentary cross-sectional view taken along the lines 2—2 of FIG. 1;
FIG. 3 is a fragmentary cross-sectional view taken along the lines 3—3 of FIG. 2;
FIG. 4 is a schematic diagram of a modification of the first embodiment, utilizing a pump instead of a deformable bulb as the gas compressing means;
FIG. 5 is a schematic diagram of another embodiment of the invention, in which a manually operated pump drives an ejector which evacuates a container;
FIG. 6 is a schematic diagram of another embodiment of the invention, in which a manually operated pump is used to pump up a container to an elevated pressure;
FIG. 7 is a schematic diagram of another embodiment of the invention;
FIG. 8 is a schematic diagram of another embodiment of the invention;
FIG. 9 is a schematic diagram of another embodiment of the invention; and
FIG. 10 is a cross-sectional view of a detail of an improved bellows for use in various embodiments of the invention.

In the drawings, similar numerals represent similar parts.

Referring now to the drawings in detail, a preferred embodiment of the invention is shown in FIGS. 1–3. In this embodiment, a deformable bulb 10, consisting of a material such as rubber or plastic, is used as a gas compressing means. Said bulb 10 contains a gaseous fluid 11, normally air. A ball check valve indicated generally as 12 permits the entry of air whenever the pressure of the gaseous fluid 11 within the bulb is not in excess of ambient pressure, but prevents the exit of gaseous fluid at this point. A turbine-flowmeter unit, indicated generally as 13, is mounted on (or otherwise pneumatically connected to the interior of) the bulb 10, for use as a pressure-averaging measuring means. As shown in FIGS. 1–3, said turbine-flowmeter unit 13 may comprise a housing 14 which is mounted on a nipple 15 in fluid-tight fashion, said nipple 15 being retained in fluid-tight manner with a thickened wall portion 16 of bulb 10 by one or more rings 17 projecting outwardly from the outer surface of said nipple 15. At the end of the nipple 15 is a nozzle or orifice 18, through which gaseous fluid 11 is expelled from bulb 10 into the turbine-flowmeter unit 13. Said expelled gaseous fluid 11 is directed tangentially at the turbine wheel 19, thereby causing the latter to rotate, in turn driving the flowmeter 20 by means of shaft 21. The fluid is exhausted to the ambient atmosphere through exhaust port 100, after having released its kinetic energy to said turbine wheel 19. Said turbine wheel 19 is preferably designed with shallow recesses 22 therein, acting as buckets, and has a substantial inertia. The purpose of providing substantial inertia in the turbine wheel is to provide a flywheel-type action, so that the flowmeter indicating needle 23 will not fluctuate widely between compression strokes of the bulb 10. Thus, the speed indicated by the flowmeter 20 will be indicative of the average pressure developed by squeezing of the bulb 10. The speed of the turbine wheel 19 is substantially a measure of the kinetic energy of the gaseous fluid directed against it. This, in turn, is substantially equal to the work done in compressing the gaseous fluid (since the gas leaves the orifice with substantially all its "pressure head" converted to kinetic energy, the pressure at the orifice being substantially atmospheric). But, for a given bulb with a given initial pressure, the work done in compressing the gas is dependent only on the pressure attained during the compression. Thus, the speed of the turbine wheel 19 is indicative of the pressure attained during the compression stage. In order for this to be so, however, the orifice velocity must not in fact be independent of said pressure, as would occur if the pressure ratio across the orifice 18 were equal to or in excess of the "critical pressure ratio" (about 0.53 for air), in which case the orifice velocity could reach the acoustic velocity. This can be avoided either by designing the apparatus so as to produce a pressure in the bulb which is not in excess of about 13 p.s.i.g. or else by utilizing a properly designed converging-diverging nozzle in place of the orifice 18, as is known in the art. In any event, the amount of restriction offered by the nozzle or orifice 18, or other restriction in the line, must not be so great as to interfere excessively with the flow of gaseous fluid therethrough (which would interfere with the repetitiveness of exercising), nor must it be so small as to prevent the development of a substantial pressure in the bulb (which would minimize the amount of work which can be done per cycle). An intermediate amount of restriction can always be selected which will result in approaching a maximum performance of work per unit time, with a more or less uniform high turbine speed. If desired, the amount of restriction may be made adjustable, for example, by providing interchangeable orifices or nozzles, or by providing a variable-opening valve or restriction in the line.

FIG. 4 shows schematically a modification of the apparatus shown in FIGS. 1–3. In this case, the deformable bulb has been replaced by other gas compressing means, shown schematically as a single-acting reciprocating pump 30 of a conventional type. If desired, this may be replaced by a double-acting reciprocating pump, a bellows, or any other suitable gas compressing means. In any event, said gas compressing means 30 is to be manually operated, either directly, or through any suitable mechanical linkages. Thus, the method and apparatus disclosed in FIGS. 1–3 is readily adaptable to any type of repetitious exercising.

FIG. 5 shows schematically another embodiment of the invention. A gas compressing means 30 in thise case is used to evacuate a container 31 to a predetermined pressure, indicated by pressure gage 32. This is accomplished by causing the gaseous fluid expelled from the pump 30 to pass through an ejector comprising a pair of converging-diverging nozzles 33, 34, the power discharging into the latter and entraining gaseous fluid from container 31. The pressure of the container is read (or recorded) versus time, thereby indicating a composite picture of the strength, speed, and endurance of the person so exercising.

FIG. 6 shows schematically another embodiment of the invention, in which a gas compressing means 30 discharges compressed gaseous fluid through a restriction 35 into a container 31. The pressure thus builds up in container 31 over a period of time, and is read on the pressure gage 32, thus indicating a similar composite picture of strength, speed, and endurance. If desired, gaseous fluid may also be allowed to leave container 31 through a restriction 36, exhausting for example to the ambient atmosphere (or to a turbine wheel not having substantial inertia). In this case, the pressure attainable in container 31 is limited by the amount of opening in restriction 36. The operation becomes continuous, resembling in principle the turbine type operation indicated in FIGS. 1–3, the container 31 acting as a surge tank, providing the equivalent of the inertia of the turbine shown in FIGS. 1–3. Restriction 36 may if desired be adjustable (e.g. it may be a valve provided with indications of the extent of opening therethrough), thereby providing many possible variations in the mode of operation. Alternatively, restriction 36 may be entirely dispensed with (or closed), in which case the operation is semi-continuous, the pressure in the container 31 increasing toward a maximum.

Other methods of measuring the average or the integrated pressure developed by the manual operation of the gas compressing means may be employed if desired.

If desired, as shown in FIG. 7, I may manually operate a vacuum pump 40, so as directly to evacuate a container 41 equipped with a vacuum gage 42, the gaseous fluid being taken from said container 41 and expelled to the ambient atmosphere.

FIGS. 8 and 9 show other embodiments of the invention, in which a pair of gas compressing means (flexible bellows in FIG. 8, and reciprocating pumps in FIG. 9) are utilized as exercising devices.

In FIG. 8, flexible corrugated bellows units 50, 50 are fastened at their lower ends to fixed supports 51 51' by fastening members 52, 52' which may be of any suitable type. The upper ends of said bellows units 50, 50' are provided with force applying members 53, 53' fastened to said bellows by fastening members 54, 54'. Said force applying members 53, 53' may, for example, comprise platforms adapted for the placing of one foot on each, with suitable straps or other fastening means therefor. Each bellows unit is equipped with an inlet check valve 55, 55' and a restriction 56, 56' in the gaseous fluid inlet line 57, 57'; it is also equipped with an exit check valve 58, 58' in the exit line 59, 59'. The exit lines 59, 59' are joined in a single exit line 60 containing a restriction 61, which leads into a container surge tank 62. Said surge tank 62 is equipped with a pressure gage 63 and with an exit line 64 containing a restriction 65.

In operation, a person attaches one foot to support 53 and the other to support 53'. He lifts one foot, then lowers it and lifts the other, and continues to repeat the alternate lifting and lowering exercise. In this way, he exercises his leg muscles both on the way down and the way up. For example, suppose at a given time he is lifting the left leg and lowering the right leg. The pressure in bellows 50' will then be increasing, while the pressure in bellows 50 will be decreasing. Thus, inlet check valve 55' will be closed and exit check valve 58' in bellows unit 50' will be open; at the same time, inlet check valve 55 will be open and exit check valve 58 in bellows unit 50 will be closed. Thus, gaseous fluid, normally air, will be entering bellows 50 through inlet line 57 and restriction 56, and gaseous fluid will be exhausting from bellows 50' through exit lines 59' and 60, through restriction 61, into surge tank 62, increasing its pressure. Because of restriction 56, force must be exerted in lifting the left leg, in order to pull air into the bellows unit 50 when its pressure tends to drop below ambient pressure. At the same time, force is required to lower the right leg, while compressing the air in bellows unit 50' and expelling it through restriction 61 into surge tank 62. The average amount of force exerted and the speed of exercising will thus affect the pressure which can be maintained within surge tank 62. Alternatively, other means of measuring the extent of compression of gaseous fluid may be utilized, as described above, such as a turbine-flowmeter unit, an ejector, pumping up a closed container, or evacuating a closed container by connecting lines 57 and 57' directly to a closed container. Since these means have been described above, they are not further described here.

If desired, the bellows units 50, 50' may be suitably stabilized against excessive transverse motion or swaying, utilizing known means therefor.

If desired, apparatus of the type shown in FIG. 8 can be used in an inverted position, as a means of exercising the arms and chest. In this case, the hands grip the bellows units 50, 50', instead of the feet being fastened thereto. In this case, the weight of the body is preferably supported from below.

Alternatively, apparatus of the type shown in FIG. 8 can be used in a horizontal position, for exercising either arms or legs, either by direct action on the bellows 50, 50', or through the use of suitable intermediary linkages.

FIG. 9 shows a modification of the basic principle disclosed in FIG. 8, in which a pair of reciprocating pumps are used in place of the bellows units. Said pumps comprise cylinders 70, 70', pistons 71, 71', and piston rods 72, 72'. The other elements are numbered similarly to those shown in FIG. 8.

FIG. 10 shows an improvement in a bellows 50'', equipped with inlet 57, inlet valve 55, exit 59, and, exit valve 58 as in FIG. 8. The improvement comprises a means of discharging compressed gaseous fluid from the interior of said bellows when the stroke reaches a desired value. This may be accomplished by means of a spring-loaded pressure relief valve 80 mounted in the lower end plate 81, which opens to exhaust gaseous fluid to the ambient atmosphere when a rod 82 suspended from the upper end plate 83 bears against the valve disc 84, as shown. This occurs when the bellows unit 50 has been compressed to a predetermined extent.

The advantage of utilizing the improvement of FIG. 10 in bellows units employed in the apparatus set forth in FIG. 8 is that the lifting of the leg will immediately create a suction in the bellows, since there is no substantial amount of gas under pressure remaining in the bellows. Such a device is not needed in the case of reciprocating pumps of the type used in the apparatus set forth in FIG. 9, since the pump can be designed to exhaust substantially all its volume of gaseous fluid. However, that is not feasible in the case of a bellows.

Various other modifications may be made in the present invention without departing from the spirit of the invention, the novel features of which are set forth in the following claims.

I claim:

1. A device for exercising and concurrently measuring the physical condition of a person, comprising in combination: manually operable gas compressing means; means for continually admitting gaseous fluid into said gas compressing means; a nozzle; a turbine wheel; means for expelling compressed gaseous fluid from said gas compressing means through said nozzle into said turbine wheel thereby continually rotating the latter; means for exhausting said gaseous fluid from said turbine wheel to the ambient atmosphere; and means for measuring the speed of rotation of said turbine wheel.

2. The device set forth in claim 1, wherein said gas compressing means comprise a deformable bulb adapted to be grasped in the hand of a person and to be readily deformed under the force of a squeezing grasp.

3. The device set forth in claim 1, wherein said gas compressing means and nozzle are so designed as to be capable of producing, under the conditions of use, a pressure not exceeding about 13 pounds per square inch gage.

References Cited in the file of this patent

UNITED STATES PATENTS

| | | |
|---|---|---|
| 482,623 | Dooling | Sept. 13, 1892 |
| 747,294 | Blaisdell | Dec. 15, 1903 |
| 1,707,449 | Rodale | Apr. 2, 1929 |
| 1,831,292 | Dootson | Nov. 10, 1931 |
| 1,955,754 | Lyon | Apr. 24, 1934 |
| 2,098,280 | Dornseif | Nov. 9, 1937 |